United States Patent
Bürgel (10) Patent No.: US 9,555,981 B2
(45) Date of Patent: Jan. 31, 2017

(54) APPARATUS AND METHOD FOR DISPENSING VEHICLE BALANCING WEIGHTS

(71) Applicant: Wegmann automotive GmbH & Co. KG, Veitshöchheim (DE)

(72) Inventor: Hans-Ulrich Bürgel, Roden (DE)

(73) Assignee: WEGMANN AUTOMOTIVE GMBH & CO. KG, Veitshochheim (DE)

( * ) Notice: Subject to any disclaimer, the term of this patent is extended or adjusted under 35 U.S.C. 154(b) by 0 days.

(21) Appl. No.: 14/488,690

(22) Filed: Sep. 17, 2014

(65) Prior Publication Data

US 2015/0010380 A1    Jan. 8, 2015

Related U.S. Application Data

(63) Continuation of application No. PCT/EP2013/054740, filed on Mar. 8, 2013.

(30) Foreign Application Priority Data

Mar. 20, 2012    (EP) .................................... 12160441

(51) Int. Cl.
   *B60P 3/12*    (2006.01)
   *B65G 59/06*   (2006.01)
   *F16F 15/32*   (2006.01)

(52) U.S. Cl.
   CPC ........... *B65G 59/067* (2013.01); *F16F 15/324* (2013.01)

(58) Field of Classification Search
   CPC ....... B65G 59/06; B65G 59/067; F16F 15/324
   (Continued)

(56) References Cited

U.S. PATENT DOCUMENTS

| 427,509 | A | * | 5/1890 | Hayden | .................... A24F 15/04 |
| | | | | | 221/133 |
| 3,756,363 | A | * | 9/1973 | Novak | ....................... G07F 7/04 |
| | | | | | 194/206 |

(Continued)

FOREIGN PATENT DOCUMENTS

| DE | 27 45 858 | * 10/1977 | ............. B65G 59/06 |
| DE | 27 45 858 |   4/1979 | |

(Continued)

OTHER PUBLICATIONS

Communication pursuant to Article 94(3) in European Application No. 12 160 441.7 dated May 5, 2013.

(Continued)

*Primary Examiner* — Michael McCullough
*Assistant Examiner* — Lynn Schwenning
(74) *Attorney, Agent, or Firm* — Norton Rose Fulbright US LLP (57) ABSTRACT

An apparatus and a method for dispensing vehicle balancing weights are disclosed. The dispenser comprises a transport unit arranged below a cartridge for storing balancing weights. The transport unit moves a balancing weight from a selected section of the cartridge on a belt conveyor for further transporting the balancing weight to a handling device. The transport unit comprises a feeder, and a plurality of stack lifters for lifting a stack of balancing weights and allowing the feeder to push a selected balancing weight under the stack of other balancing weights towards the belt conveyor.

11 Claims, 5 Drawing Sheets

(58) Field of Classification Search
USPC .................. 414/797.5, 796.7, 796.8, 801
See application file for complete search history.

(56) References Cited

U.S. PATENT DOCUMENTS

| | | | | |
|---|---|---|---|---|
| 3,933,255 | A * | 1/1976 | Lieder et al. ............... | 414/795.7 |
| 3,991,909 | A * | 11/1976 | Ballestrazzi et al. ......... | 221/214 |
| 4,457,665 | A * | 7/1984 | Fluck ........................... | 414/801 |
| 4,844,686 | A * | 7/1989 | Stevenson .............. | B65G 57/32 |
| | | | | 221/112 |
| 5,065,897 | A * | 11/1991 | Smith ......................... | 221/130 |
| 5,480,280 | A * | 1/1996 | Bordon ................ | B65G 59/062 |
| | | | | 221/292 |
| 5,645,392 | A * | 7/1997 | Leichty et al. .......... | 414/416.01 |
| 5,713,718 | A * | 2/1998 | Okura .................. | B65G 59/068 |
| | | | | 271/10.02 |
| 5,893,701 | A * | 4/1999 | Pruett ....................... | 414/798.2 |
| 6,089,819 | A * | 7/2000 | Barnes ...................... | 414/794.7 |
| 6,364,421 | B1 | 4/2002 | Pursley ........................ | 301/5.21 |
| 7,731,473 | B2 * | 6/2010 | Yuyama et al. ........... | 414/795.6 |
| 2003/0183645 | A1* | 10/2003 | Shin ........................ | G07F 11/10 |
| | | | | 221/133 |
| 2009/0028688 | A1* | 1/2009 | Hashinokuchi ...... | B65G 57/302 |
| | | | | 414/798.1 |
| 2009/0306813 | A1* | 12/2009 | An ............................... | 700/218 |
| 2010/0104412 | A1* | 4/2010 | Abascal Albizu et al. ........................ | 414/795.2 |

FOREIGN PATENT DOCUMENTS

| | | |
|---|---|---|
| DE | 83 13 868 | 12/1986 |
| EP | 0 037 989 | 10/1981 |
| EP | 1 613 876 | 1/2006 |
| FR | 2 838 114 | 10/2003 |
| JP | 56-043836 | 9/1979 |
| JP | 57-009636 | 1/1982 |
| JP | 03-064931 | 3/2003 |
| JP | 2003-164932 | 6/2003 |
| JP | 2006-335514 | 12/2006 |
| JP | 07-282347 | 10/2007 |
| JP | 2009-292647 | 12/2009 |
| JP | 2002-012324 | 1/2012 |
| WO | WO/03/022719 | 3/2003 |
| WO | WO/2008/103651 | 8/2008 |

OTHER PUBLICATIONS

Communication under Rule 71(3) EPC in European Application No. 12 160 441.7 dated Nov. 4, 2013.

Decision to grant a European patent pursuant to Article 97(1) EPC in European Application No. 12 160 441.7 dated Apr. 17, 2014.

International Search Report in International Application No. PCT/EP2013/054740 mailed May 3, 2013.

Search Report in European Application No. 12 160 441.7 dated Aug. 2, 2012.

* cited by examiner

APPARATUS AND METHOD FOR DISPENSING VEHICLE BALANCING WEIGHTS

PRIORITY CLAIM

This application is a continuation of pending International Application No. PCT/EP2013/054740 filed on Mar. 8, 2013, which designates the United States and claims priority from European Application No. 12160441.7 filed on Mar. 20, 2012, both of which are incorporated by reference in their entireties.

BACKGROUND OF THE INVENTION

1. Field of the Invention

The invention relates to methods and devices for dispensing weights used in vehicle ballasting applications, in particular for dispensing weights used in balancing automobile or other vehicle wheels.

2. Description of Relevant Art

In automotive wheel balancing, individual wheel balancing weights are applied to specific positions of a rim. Basically, two types of balancing weight are used. The first kind is a balancing weight which is attached by a clamp, as disclosed in the European patent EP 1 613 876 B1, while the second kind is fixed by means of a self-adhesive tape, as disclosed in U.S. Pat. No. 6,364,421 B1.

Both kinds of balancing weights are available in a plurality of sizes, resulting in different weights. When balancing a vehicle wheel, the correct size of balancing weight is selected and attached to the rim. Most balancing weights are supplied as bulk material in boxes, from which the required number of weights is manually taken.

This allows for a simple, comparatively cheap supply of balancing weights. The drawback is that the person who is taking the weights from the box may take a wrong weight, and therefore a further step of balancing is required. Furthermore, the process of taking the weights can hardly be automated. Therefore, other solutions as disclosed in WO 2008/103651 A1, using a continuous polymer tape, have been developed. This has the drawback that a solid balancing weight is significantly more robust and reliable than these continuous tapes.

DE 27 45 858 A1 discloses an apparatus for dispensing of components from a cartridge by means of a transport unit and a belt conveyor.

SUMMARY OF THE INVENTION

The embodiments are based on the object of providing an apparatus and a method for automatic dispensing vehicle balancing weights, or dispensing one or a plurality of weights adapted for a required balancing task. The weights should be dispensed in such a way that they can be handled by an automatic handling system for applying the weights to a rim.

In a an embodiment, at least one cartridge is attached to at least one transport unit for selecting individual weights from the cartridge and moving the selected weights to a belt conveyor in front of the drive unit. The at least one cartridge comprises a plurality of trays, wherein each tray can hold vehicle balancing weights. The trays may be designed to hold a plurality of different balancing weights. They furthermore may be adapted to specific sizes of balancing weights. The trays may have a visible and/or computer readable encoding of at least one of tray size, tray capacity, balancing weight size, quantity of balancing weights in the tray. This may be done by a printed code like a number, a bar code or an electronic code like a transponder or a memory chip which may be contacted by a microcontroller. Such an encoding may also be applied to the at least one cartridge. Furthermore, it is preferred, if each tray comprises at least one section, preferably at least two sections or a plurality of sections which may be suited for accommodating different balancing weights. Each section may contain a single stack or a plurality of stacks of balancing weights. Preferably there are successive stacks or section.

The transport unit has at least one feeder for moving a selected balancing weight from a specific section of one of the trays to the belt conveyor. The feeder preferably performs a linear movement and preferably is driven by a linear drive. Furthermore, at least one stack lifter is provided for lifting a stack of balancing weights within a section of the trays. Preferably there is one stack lifter provided for each section. There may be no stack lifter at the sections being most distant from the belt conveyor for each feeder. These stack lifters are interacting with the feeder. The feeder is moving one selected balancing weight to the belt conveyor which is lying on a transport surface from a tray section. The balancing weights of the other sections which are not selected either are lifted by stack lifters above the feeder or are sliding on the feeder's surface and remain within their sections, so that they cannot be transported to the belt conveyor. The feeder may be operated in two different modes, which may be combined. In a first mode, the balancing weights are accessed sequential. Here, the feeder is pulled back from the belt conveyor with its end to a position behind the first section closest to the belt conveyor, but before the second section. When the feeder has reached this position, the whole stack of balancing weights in the first section falls down so that the balancing weight at the bottom lies on a transport surface. Now, the feeder may be pushed forward, pushing the bottom balancing weight towards the belt conveyor, until the balancing weight falls on the belt conveyor. Then, the cycle is repeated again. If one section is empty, the procedure is repeated with the next section until all sections are empty. In a different embodiment of the feeder, the feeder may have an opening suited for accommodating one balancing weight. In this embodiment, the feeder is also pulled back from the belt conveyor until the balancing weight at the bottom of the first section closest to the belt conveyor can fall into this opening. Then, the direction of the feeder is reverted towards the belt conveyor and the balancing weight is transported to the belt conveyor. After all balancing weights of the first section have been transported to the belt conveyor, the feeder moves until it reaches the next section containing balancing weights, which may be the second section, and repeats the same procedure as before. In this way, one section after the other may be emptied. This mode of operation even works without stack lifters. Therefore, according to a simplified embodiment, only a feeder is provided for transporting the balancing weights from the at least one cartridge to the belt conveyor. In this case, the balancing weights are sliding on the surface of the feeder. Therefore, it is further preferred, if the feeder has a surface with a low friction coefficient, which preferably may be achieved by some low friction coating like PTFE.

In a second operating mode, the balancing weights are retrieved from any selected section. This may be useful to select different types of balancing weights like different colors. There is at least one stack lifter which is interacting with the feeder. Preferably, the stack lifters lift up all stacks in sections which are not the selected one. If, for example, the second section is selected, it is preferred, if the stack lifters lift the stack of balancing weights in the first, third, and all consecutive sections up, so that the feeder can be moved without transporting and preferably without touching any one of the balancing weights of these sections. Only the stack lifter of the selected second section remains inactive, therefore allowing the balancing weights of the second stack to fall down to the transport surface after the feeder has been pulled back sufficiently. If the feeder is pushed forward towards the belt conveyor with the selected balancing weight, it has to pass other not selected sections, like the first section in this example. Before passing such sections, the stack lifter must lift the stack in such sections. In an alternative embodiment, the stack may be lifted all the time. In this in the above example, preferably, the stack lifter of the first section has to lift the stack as soon as the selected balancing weight moves below the first stack and therefore can bear the load of the stack of balancing weights. By using this mode, any kind of balancing weights may be transported. It is not necessary to have shapes of balancing weights which allow sliding of stacked balancing weights against each other, as the balancing weights are held and guided by the stack lifter, the feeder and the latch.

In a further embodiment, an additional latch is provided which prevents the balancing weights falling down after a stack lifter has been retracted. The latch may be closed locking a stack in its position, until this stack is selected again.

As disclosed, any section of a tray may be selected for delivering a balancing weight to the belt conveyor. In a first embodiment, all sections of a tray may contain the same size of balancing weights, although it is also possible to use different sizes of balancing weights within different sections of the same tray. Furthermore, it may be possible to use different sections with different colors and/or design of balancing weights, preferably of the same size.

In a further preferred embodiment, there is at least one conveyor sidewall at at least one side of the belt conveyor, preventing balancing weights on the belt conveyor to leave the belt conveyor. Furthermore, the sidewalls may be designed to align the balancing weights transported on the belt conveyor. The conveyor sidewalls may further be dynamically adjustable by a drive to bring the transported balancing weight into a specific position at the belt conveyor.

In a further embodiment, at least one sensor is provided for detecting, whether at least one balancing weight is available in a section of the cartridge. This allows for control of selection of individual weights.

By using the apparatus disclosed herein, balancing weights may be selected and delivered with a comparatively high speed. Furthermore, by using multiple cartridges and/or trays in parallel, containing the same type of balancing weight, the speed of deliverance, which may be limited by mass inertia, specifically of the stacks of balancing weights, may be increased. When a section of the cartridge has become empty, it may be continuously refilled during operation without affecting operation. In an alternative embodiment, individual sections, trays, or cartridges may be replaced by refilled sections trays or cartridges. In a further embodiment, at least two sections, trays, or cartridges may be used in parallel to the same belt conveyor, while one is in operation, and the other is being replaced or being refilled.

A further embodiment relates to a method for dispensing vehicle balancing weights. The method comprises at least the steps of providing balancing weights within a cartridge, preferably comprising at least one tray and further comprising at least one section containing at least one balancing weight. The further steps comprise of selecting at least one section and transporting by a transport unit the bottommost balancing weight of the section to a belt conveyor. A further step comprises transporting the selected balancing weight by the belt conveyor to at least one chute or tray. In a further optional step, a selected tray of a plurality of trays may be moved into a position relative to the belt conveyor. In a next step the balancing weight transported on the belt conveyor is transported into the tray.

In a further embodiment, there may be at least one tray at the end of the belt conveyor. The at least one tray may be fed by a chute; it may be part of a chute or may contain a chute. In a preferred embodiment, a plurality of trays which is moveable against the belt conveyor is arranged at the end of the belt conveyor, allowing to select at least one of the trays, where an individual balancing weight is delivered. This allows for commissioning of a plurality of balancing weights which are required for a balancing task.

In a further embodiment, the cartridge, the trays, or sections thereof are removable or exchangeable.

Preferably, a belt conveyor is used to transfer at least one balancing weight from the transport unit to a handling device. This may be any automated system like an industrial robot. In specific cases, the balancing weights may also be manually handled. There may be any intermediate device like a chute or trays.

In a further embodiment, a controller is provided for controlling the transport unit. The controller may receive as an input signal a parameter describing which type of balancing weight is desired or describing a specific section and/or tray and/or cartridge from which a balancing weight is desired. It may further supply a time at which the balancing weight should be delivered. The controller is then controlling the transport unit and preferably the belt conveyor in such a way, that the selected balancing weight is received at the end of the belt conveyor at the optionally specified time. Most preferably, the controller controls the feeder drives and the stack lift actuators, and the drives of the latches, as well as any further actuators. Furthermore, it evaluates signals from sensors, like the sensors for checking the availability of balancing weights in individual sections. It may furthermore evaluate signals from any further sensors. In addition, it may control the speed of the belt conveyor, and/or the position of trays.

It is obvious that the embodiments disclosed herein are applicable to a broad variety of balancing weights like balancing weights which may be held by a clamp or clip or self-adhesive balancing weights.

BRIEF DESCRIPTION OF THE DRAWINGS

In the following, the invention will be described by way of example, without limitation of the general inventive concept, on examples of embodiment and with reference to the drawings.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
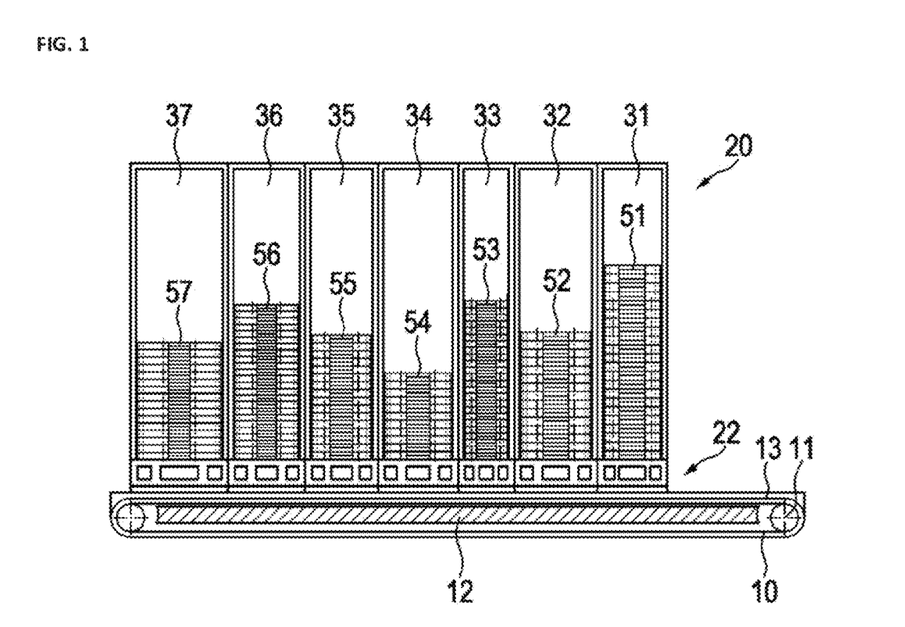
FIG. 1 shows an apparatus for dispensing vehicle balancing weights.

In FIG. 1, a preferred embodiment is shown. A belt conveyor 10 is provided for moving balancing weights from a cartridge 20 to a chute or at least one tray or any other device for further processing the balancing weights which may be attached to any one side of the belt conveyor. The belt conveyor 10 may have a conveyor pulley 11, and it further may have a belt support 12, which may increase stability on large lengths of the belt. Below the cartridge 20, there is at least one transport unit 22 for transporting balancing weights from the cartridge to the belt conveyor. The cartridge 20 may comprise of at least one tray 31 to 37. These trays may be filled with balancing weights 51 to 57. In the individual trays, there may be different numbers, different sizes, different types, different colors, and different designs of balancing weights.

Figure 2:
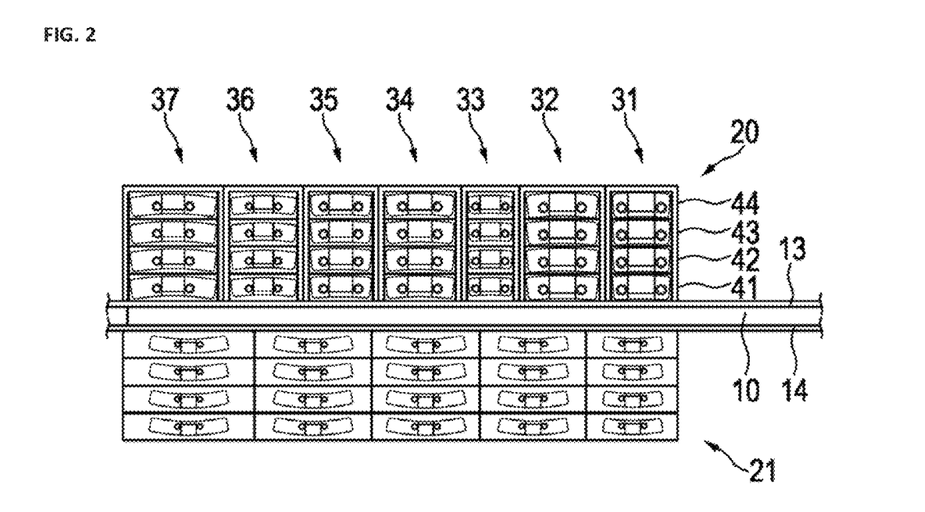
FIG. 2 shows the apparatus in a top view.

In FIG. 2, a top view of the dispensing apparatus is shown. Here, a first cartridge 20 is shown on one side of the belt conveyor, and a second cartridge 21 at the other side. The belt conveyor 10 has conveyor sidewalls 13 and 14, preventing balancing weights from falling off the belt conveyor. The cartridges have individual trays 31 to 37 which are further subdivided into sections 41 to 44. Each tray may have an individual number of sections, although it is preferred to have the same number of sections. The cartridges may have a different number of trays and sections as shown herein. Furthermore there may be only one of the cartridges at one side of the belt conveyor. Alternatively there may be a higher number of cartridges.

Figure 3:
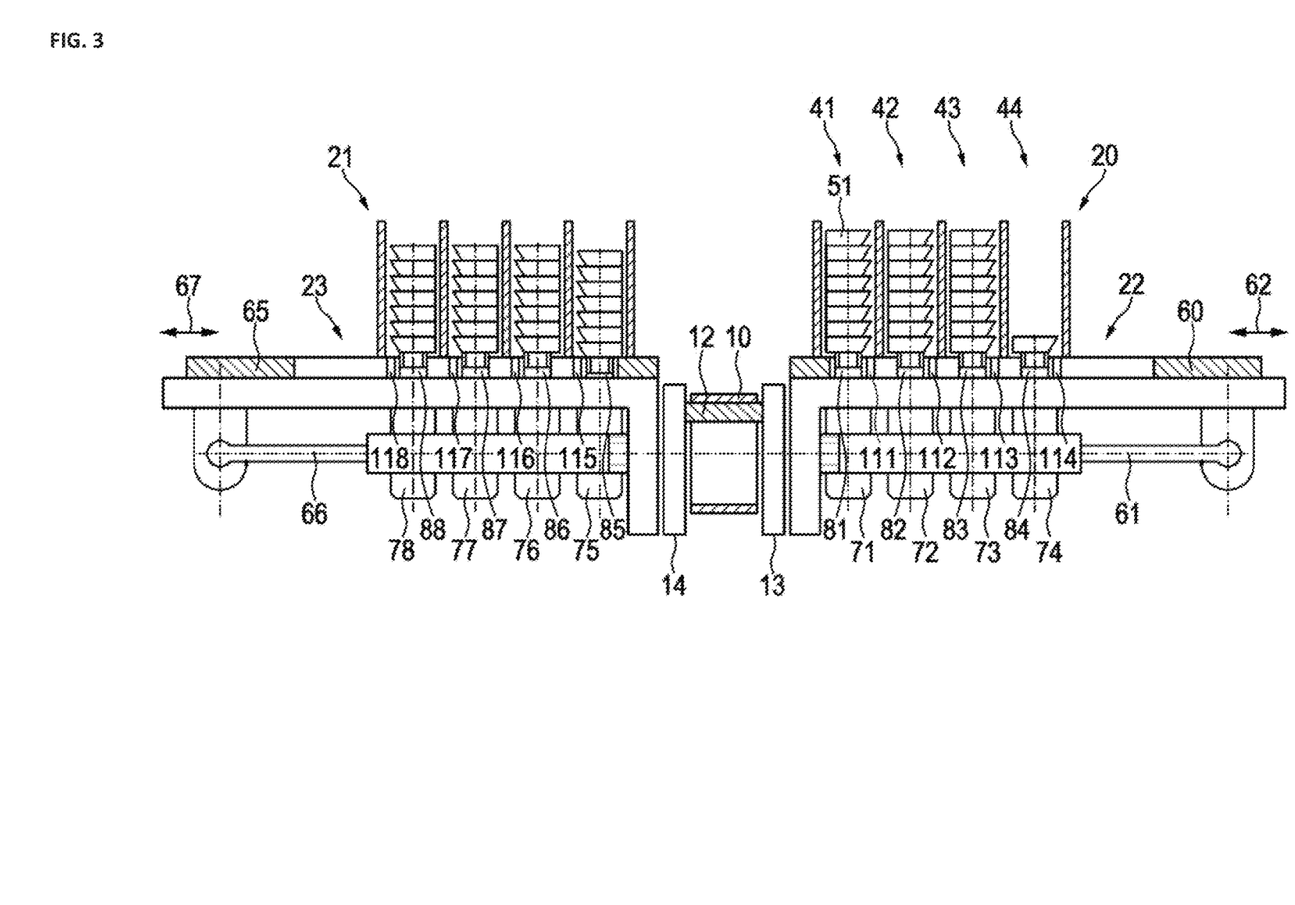
FIG. 3 shows a cross-section of the apparatus.

In FIG. 3, an embodiment is shown in a cross-section in detail. In the center, belt conveyor 10 is shown with conveyor sidewalls 13 and 14. At both sides of the conveyor sidewalls, transport units 22 and 23 are shown. On top of the transport units are cartridges 20, 21, showing sections 41 to 44 and containing balancing weights 51. The main part of the transport unit are the feeders 60, 65, which can be moved into directions 62, 67 by means of feeder drives 61, 66. Furthermore, a plurality of stack lifters 81 to 84 associated with transport unit 22, and stack lifters 85 to 88 associated with transport unit 23 are provided. These stack lifters may lift the stacks of balancing weights within the sections which are not selected. The stack lifters are operated by stack lift actuators 71 to 78, which may for example be solenoids, electromagnetic, hydraulic or pneumatic drives.

Figure 4A:
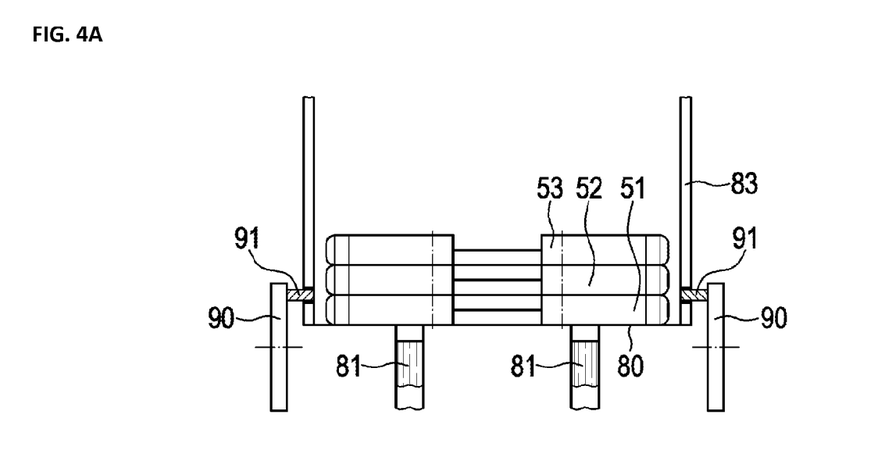
FIGS. 4A-4C show front views of the transport unit.
Figure 4B:
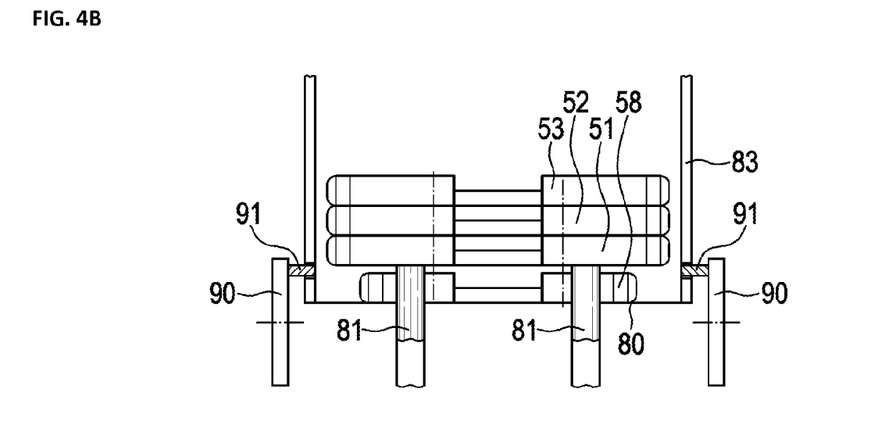
Figure 4C:
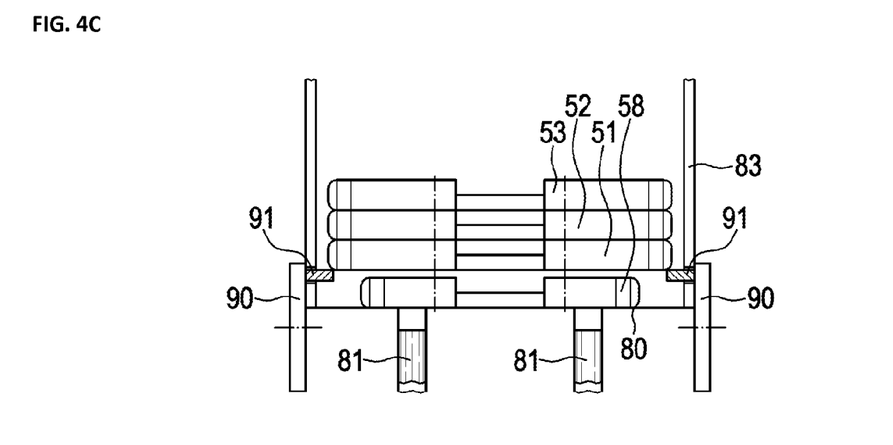

In FIGS. 4a, 4b and 4c, details of the operation of the stack lifter and the feeders in the transport unit are shown. FIG. 4a shows the starting position, where stack lifters 81 are in an idle position. Balancing weights 51, 52, and 53 are supported on a transport surface 80. The latches 90 are also in an idle position. FIG. 4b shows the next step of operation, when the stack lifters 81 are moved upwards, thereby lifting the stack of balancing weights one position up. Accordingly, now an open space of the height of at least one balancing weight is below the previously bottommost balancing weight 51. In this Figure, balancing weight 58 belonging to a section behind the section shown can be seen. In an exemplary embodiment, this balancing weight is of a smaller size and therefore shorter than the balancing weights 51, 52, 53 in the front section. The next step of operation is shown in FIG. 4c. Here, stack lifters 81 are again brought into their idle position. To prevent the stack of balancing weights 51, 52, 53 from falling back to the transport surface 80, latches 90 are brought into operation position, where guides 91 interact with the bottommost balancing weight 51, thus keeping the whole stack in a lifted position and allowing balancing weight 58 to be moved along transport surface 80 by a feeder 60, 65 (not shown herein).

Figure 5:
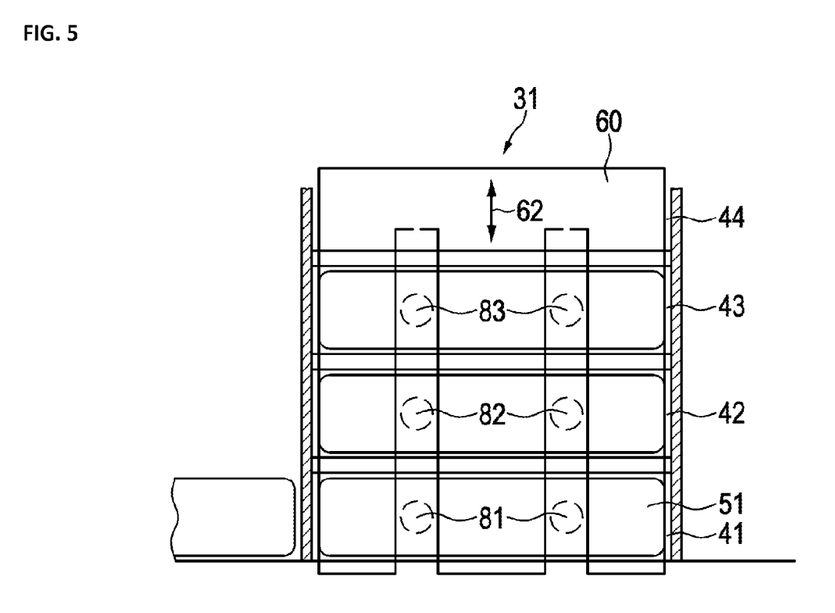
FIG. 5 shows a top view of the feeder.

Further details of the operation of the feeder are shown in FIG. 5. It shows a top view, in which the individual stack lifters 81, 82, 83, belonging to different sections 41, 42, 43 are shown. They may lift individual balancing weights 51 as previously explained. Preferably, the feeder 60 is fork-shaped to allow movement even when the stack lifters 81, 82, 83 are in their operating position. Generally the number of stack lifters within a section may vary. Dependent of the type of balancing weight, there may be one stack lifter or even three or more stack lifters, which are operated synchronously.

Figure 6:
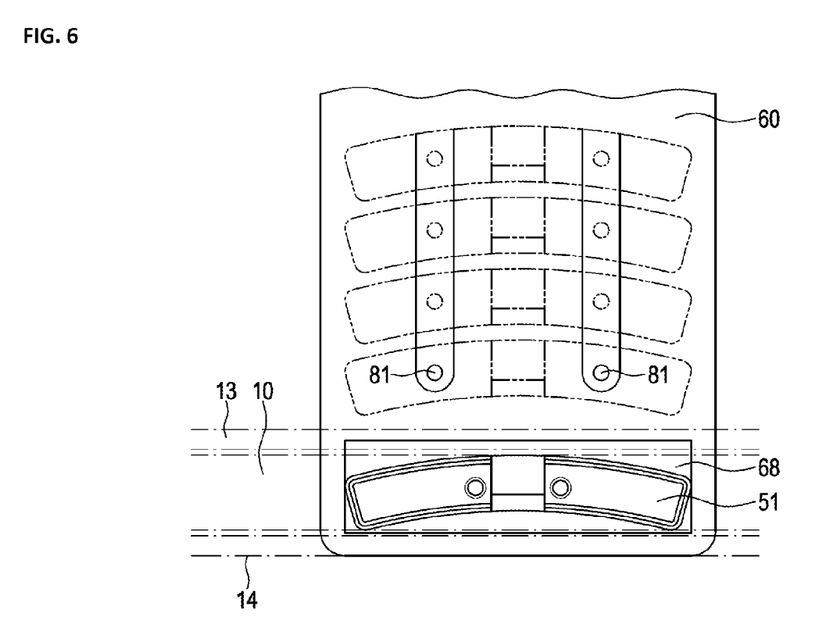
FIG. 6 shows a different feeder.

A further embodiment with an alternative feeder 60 is shown in FIG. 6. Herein, the feeder has a cut-out section 68 for holding balancing weight 51. This allows for more precise transport and positioning of balancing weight 51.

Figure 7:
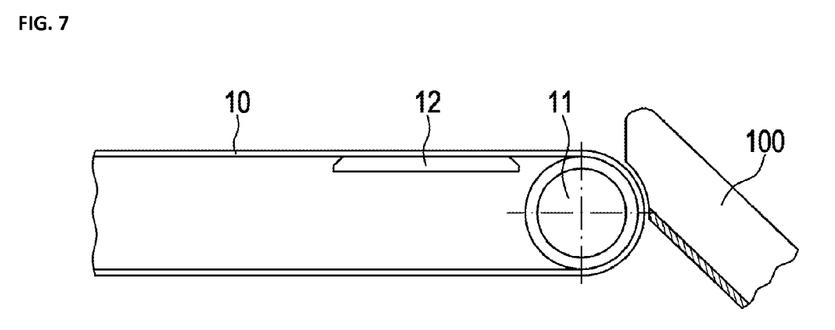
FIG. 7 shows the belt conveyor with a tube.

In FIG. 7, a side view of the belt conveyor is shown. The belt conveyor may have a belt support 12 and a conveyor pulley 11 at its end. Furthermore, a chute 100 may be provided for transporting the balancing weight from the conveyor pulley.

Figure 8:
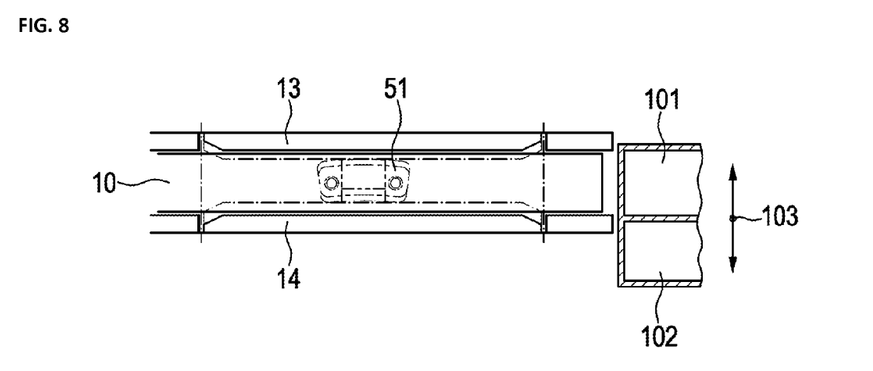
FIG. 8 shows the belt conveyor with trays.

In FIG. 8, a top view of a belt conveyor 10 is shown. Preferably, there are at least one or two sidewalls 13, 14, which preferably may be adjusted in a distance for aligning balancing weights 51 during transport by the belt conveyor. At the end of the belt conveyor, there may further be provided at least one, preferably a plurality of trays 101, 102, which may be moved into the direction 103 for selecting an individual tray into which the balancing weight is transported.

Figure 9:
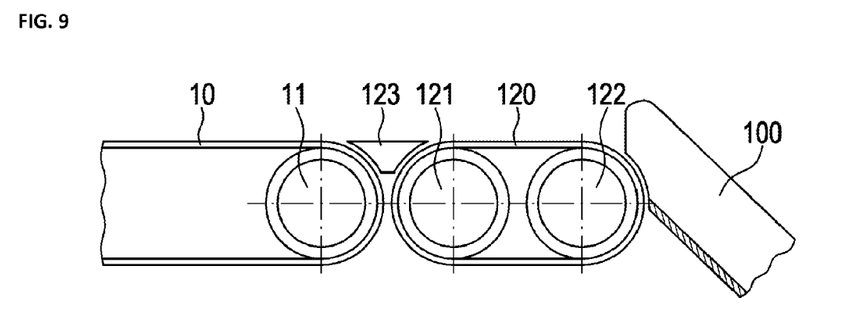
FIG. 9 shows a second belt conveyor.

In FIG. 9 a second belt conveyor is shown. It comprises a second belt 120, second conveyor pulleys 121, 122 and a support 123. This belt conveyor may be controlled independent of the first belt conveyor. Therefore it may be used as a platform for a handling device like an industrial robot to pick up a balancing weight. Here the second belt conveyor brings the balancing weight into the correct position for picking up, which may be dependent on weight size and type. At the same time the first belt conveyor may be running and transporting the next balancing weight. Of course the first belt conveyor may also be used to deliver a balancing weight to a position from which it can be picked up. By using two conveyors, transport over a longer distance between the cartridges, which also takes time can be separated from picking up and results in a significant increase of delivering speed and throughput.

It will be appreciated to those skilled in the art having the benefit of this disclosure that this invention is believed to provide methods and devices for dispensing weights used in vehicle ballasting applications. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 belt conveyor
11 conveyor pulley
12 belt support
13, 14 conveyor sidewalls
20, 21 cartridge
22, 23 transport unit
31-37 trays
41-44 sections
51-57 balancing weights
60, 65 feeder
61, 66 feeder drive
62, 67 feeder movement direction
68 cut-out section
71-78 stack lifter actuators
80 transport surface
81-88 stack lifters
90 latch
91 guide
100 chute, tray
101, 102 trays
103 direction of movement of trays
111-118 sensors
120 second belt
121, 122 second conveyor pulleys
123 support

The invention claimed is:

1. Apparatus for dispensing vehicle balancing weights, the apparatus comprising:
at least one cartridge adapted to store at least one balancing weight, the cartridge further comprising a plurality of sections;
a belt conveyor configured to transport at least one balancing weight to a handling device;
at least one transport unit, located below the at least one cartridge, configured to transport a selected balancing weight from a selected section of the at least one cartridge to the belt conveyor;
the at least one transport unit comprising a feeder configured to move the selected balancing weight from the selected section and push the selected balancing weight onto the belt conveyor, the feeder configured to move in a linear direction toward the belt conveyor;
a plurality of stack lifters each configured to move upwards to lift any balancing weights in a corresponding one of the plurality of sections from a first position to a second position above the first position, such that when at least one of the plurality of sections is between the selected section and the belt conveyor the feeder can move the selected balancing weight toward the belt conveyor under any lifted balancing weights in the at least one section between the selected section and the belt conveyor; and
latches having guides to interact with the bottommost balancing weight of a section, and keeping the whole stack in a lifted position.

2. An apparatus for dispensing vehicle balancing weights according to claim 1, wherein the at least one feeder is fork-shaped and has cut-outs for the stack lifters.

3. An apparatus for dispensing vehicle balancing weights according to claim 1, wherein the at least one feeder has a cut-out section for accommodating at least one balancing weight.

4. An apparatus for dispensing vehicle balancing weights according to claim 1, further comprising at least one sidewall at the sides of the belt conveyor.

5. An apparatus for dispensing vehicle balancing weights according to claim 4, wherein at least one of the sidewalls is adjustable for aligning the transport of at least one balancing weight by the belt conveyor.

6. An apparatus for dispensing vehicle balancing weights according to claim 4, further comprising at least one chute positioned at an end of the belt conveyor.

7. An apparatus for dispensing vehicle balancing weights according to claim 4, further comprising at least one tray positioned at one end of the belt conveyor.

8. An apparatus for dispensing vehicle balancing weights according to claim 4, wherein the at least one tray is moveable such that any selected tray may be loaded by the belt conveyor.

9. An apparatus for dispensing vehicle balancing weights according to claim 1, wherein at least one cartridge and at least one transport unit are provided on each side of the belt conveyor.

10. Method for dispensing vehicle balancing weights, the method comprising the steps of:
providing a cartridge having a plurality of sections each containing at least one balancing weight;
selecting a section of the cartridge from which a balancing weight should be taken;
lifting the balancing weights in sections between the selected section and a belt conveyor to permit a balancing weight to be transported to the belt conveyor;
keeping the lifted balancing weights in a lifted position using latches that have guides interacting with the bottommost balancing weight of a section; and
pushing the bottom-most balancing weight of the selected section under the sections with lifted balancing weights onto the belt conveyor.

11. A method for dispensing vehicle balancing weights according to claim 10, further comprising the step of transporting a balancing weight by the belt conveyor to a handling device.

* * * * *